June 12, 1962   W. W. KLEIN, JR   3,038,661
APPARATUS FOR GENERATING SINE AND COSINE FUNCTIONS
Filed Sept. 28, 1959   3 Sheets-Sheet 2
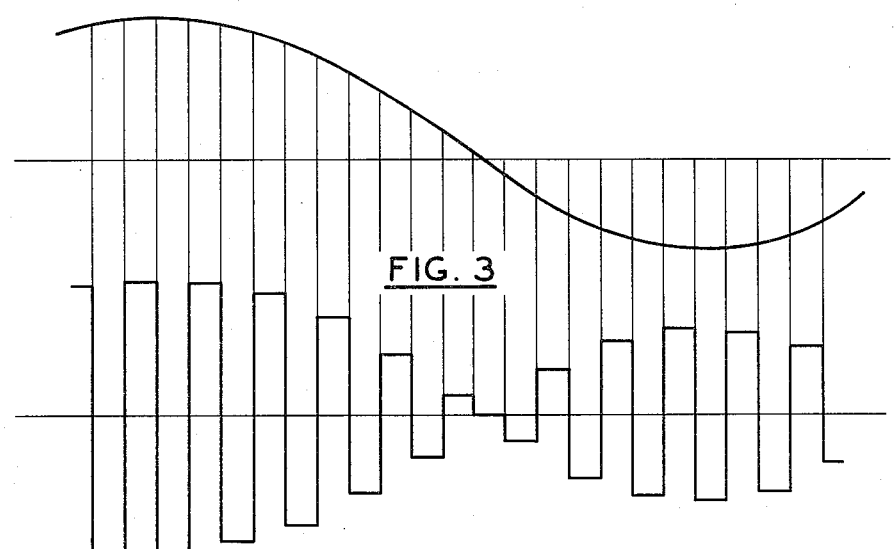
FIG. 3
FIG. 4
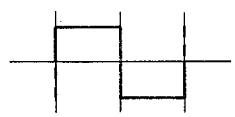
FIG. 5
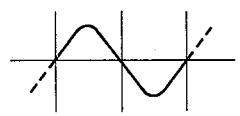
FIG. 6
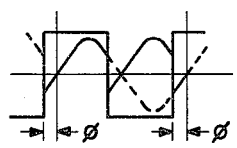
FIG. 7
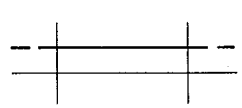
FIG. 8
INVENTOR
WALTER W. KLEIN, JR.
BY
ATTORNEYS United States Patent Office 3,038,661
Patented June 12, 1962

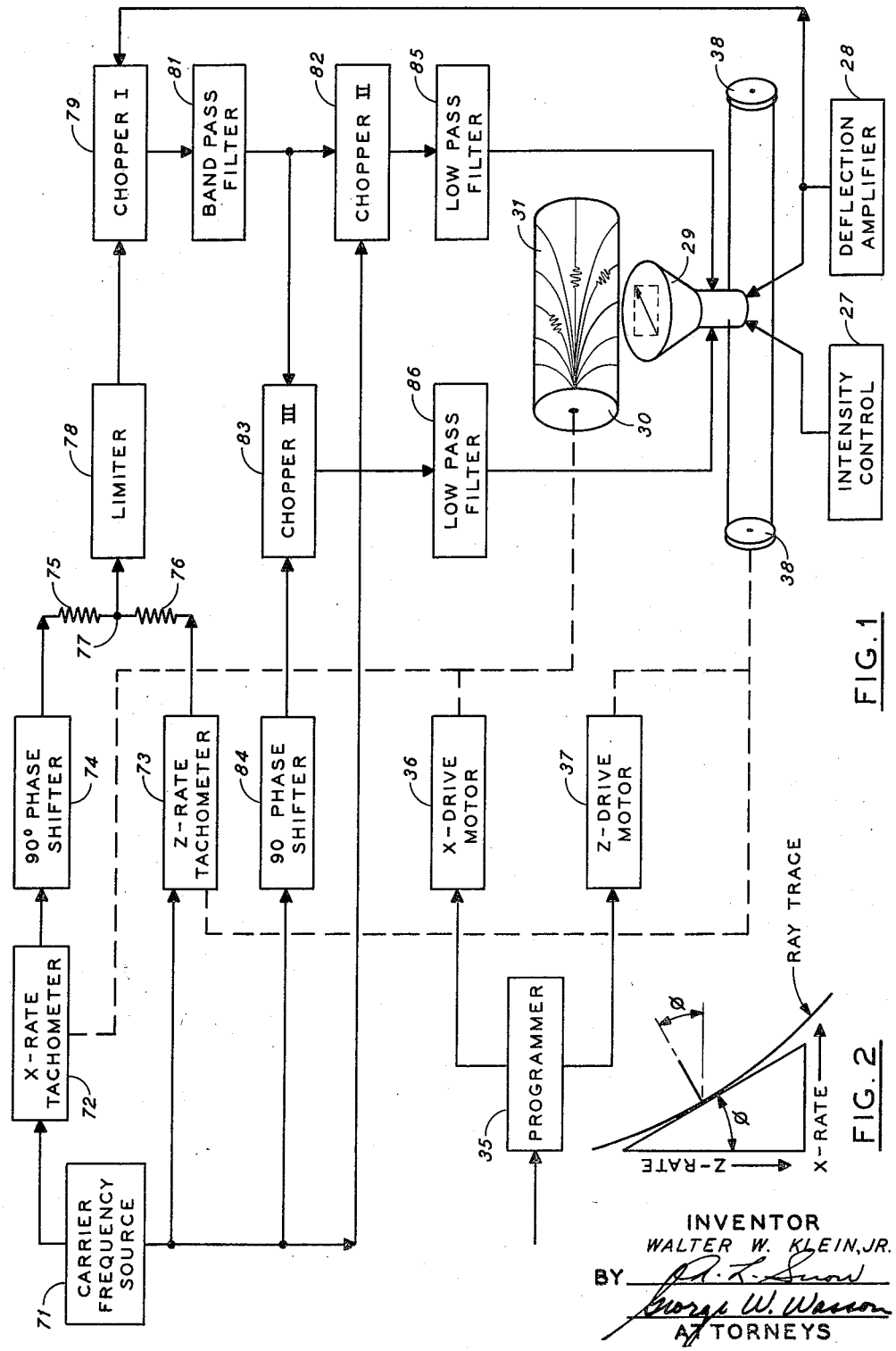

3,038,661
APPARATUS FOR GENERATING SINE AND
COSINE FUNCTIONS
Walter W. Klein, Jr., Fullerton, Calif., assignor to California Research Corporation, San Francisco, Calif., a corporation of Delaware
Filed Sept. 28, 1959, Ser. No. 842,835
3 Claims. (Cl. 235—189)

This invention relates to seismic data plotting apparatus and more particularly to a method and apparatus for producing more accurate displays of directional seismic information. The apparatus of the present invention has utility in the analysis of information other than seismic data and may be useful in plotting any information requiring a display of data perpendicular to an instantaneous direction of travel rather than to a coordinate identification of the location of the display of the data.

In the display of directional seismic information as described in the copending application of Lee P. Stephenson, Serial No. 803,906, filed April 3, 1959 for "Automatic Seismic Data Processing Method and Apparatus" the method of analyzing conventional seismic records containing locational seismic data to derive directional seismic information from the data and to display the directional seismic information in migrated form has been disclosed. In that application, the origin of seismic reflection events in the locational seismic traces of a conventional seismic record is described as identifying acoustic impedance discontinuities within the subsurface formations of an earth structure that are, at the point of reflection, perpendicular to the ray path of the seismic energy travelling in the formations. The invention discloses a system for extracting directional seismic information from the locational seismic data for identification of the subsurface formations of the earth structure. The invention further discloses a method for displaying the directional seismic data in migrated form. In the display of the directional seismic traces extracted from the directional seismic traces, the ray paths of the seismic energy travelling in the formations are reproduced on a display surface and the seismic events along the time axis of the directional seismic trace are plotted in elapsed time along the ray paths of the display. One form of plotting apparatus for the display of seismic data has been disclosed in the aforementioned copending application as a display surface and a cathode ray oscilloscope with energizable motor means for producing relative movement between the plotting oscilloscope and the display surface. In that apparatus, the display surface and oscilloscope are moved in accordance with the incremental coordinates identifying ray paths to affect migration of the seismic trace from a reference point at or near the earth's surface as represented on the display surface to reflecting horizons within the represented subsurface formations.

In addition to the relative movement in the coordinates described above, a third relative movement is required in the plotting of seismic data in migrated form. The third relative movement takes into consideration the angular relationhip between the subsurface acoustic impedance discontinuity and a datum plane on the earth's surface and requires that any plotted reflector be perpendicular to the ray path of seismic energy at the point of reflection within the subsurface formations since only reflecting formations and ray paths having this generally perpendicular relationship can contribute to the detected reflection energy at the earth's surface. To accomplish this relative movement, the deflection voltages applied to the cathode ray oscilloscope must be modified in accordance with the sine and cosine function of the coordinate relationship of the event being displayed to produce an accurate display. Furthermore, a coordinate identification of the event being displayed is not the complete definition of the angle at which the event should be displayed, since the route through which the ray path travelled to the point of display will define the instantaneous direction of travel of the seismic information. It is therefore necessary that the instantaneous rates of travel of the seismic ray path in coordinate directions be identified to establish the trigonometric functions of the angle at which the deflection of the electron beam of the cathode ray oscilloscope must be moved to produce the accurate display of a seismic event.

It is an object of the present invention to provide a method and apparatus for analyzing the instantaneous direction of travel of a curving display line to determine the angular definition of a perpendicular to the display line as related to a reference line on a display surface. A further object of the present invention is to provide an apparatus for determining the instantaneous sine and cosine function of the angular relationship between a line perpendicular to a curving display line and a reference datum line in terms of the route being travelled along said curving display line.

A further object of the present invention is to provide an apparatus for controlling the deflection voltages of a cathode ray oscilloscope to control the direction of oscillation of the electron beam being moved in accordance with oscillatory signals applied to the deflection plates of the oscilloscope so that said oscillations will be at all times perpendicular to the longitudinal reference line of the information being displayed.

Further objects and features of the invention will be fully apparent to those skilled in the art from the specification and appended drawings illustrating a certain preferred embodiment in which:

FIG. 1 is a block diagram of a resolver for control of the deflection of a cathode ray oscilloscope;

FIG. 2 is a geometric illustration of the resolution function performed by the apparatus of FIG. 1;

FIGS. 3–8 are wave form diagrams related to the apparatus of FIG. 1;

Figure 9:
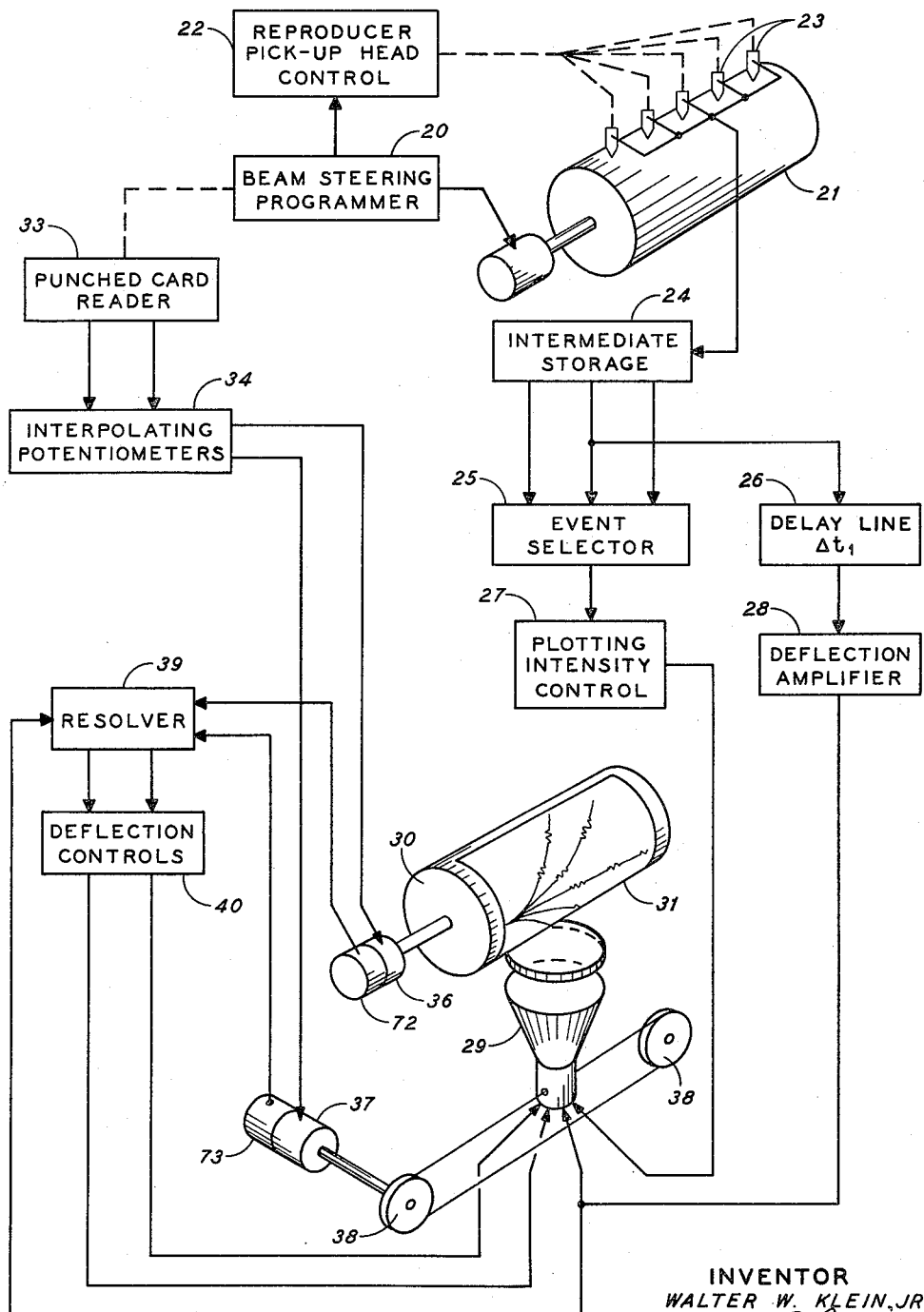
FIG. 9 is a block diagram of a seismic data plotting apparatus employing the resolver of the present invention.

FIG. 1 illustrates an electronic apparatus for performing the present invention and constitutes that portion of the plotting apparatus of FIG. 9 included in the resolver block 39. The apparatus has the purpose of controlling the individual excursions of the electron beam within the oscilloscope 29 employed to display migrated seismic data on the display surface 31. FIG. 1 is a block diagram illustration of the elements of the apparatus employed in converting the instantaneous relative positions of the oscilloscope and display surface to sine and cosine voltages for deflection control of the oscilloscope within the plotting apparatus. Referring first to FIG. 2 wherein a separate ray trace is shown having a curved path as may be encountered in the other than vertical ray paths of seismic energy within the formation, a particular point on the ray trace has been singled out and a line perpendicular to the trace has been drawn at that point. The perpendicular line makes an angle $\phi$ with the horizontal. In the plotting operation, the seismic signals of directional seismic traces are superimposed upon the ray trace with the oscillatory excursions of the signals being in a direction perpendicular to the ray trace, for instance, in the direction of the arrow drawn perpendicular to the ray trace. In FIG. 1, the drum 30 carrying the display surface 31 and the oscilloscope 29 for scanning the display surface 31 are shown with their respective drive motors 36 and 37. It may be seen that with the plotting of a curved ray path on the display surface 31 so that part of the ray trace assumes the angle $\phi$ with the vertical, the corresponding oscillation represented on the cathode ray tube face takes on a vertical and horizontal component. The vertical component must be equal to the unmodified value of the seismic signal multiplied by the sine of the angle $\phi$ and the horizontal component must be multiplied by the cosine of the angle $\phi$. In this manner the vector result of the two components is the same as the original seismic signal with excursions equal to the strength of the seismic signal, regardless of whether they are vertical, horizontal, or at the angle $\phi$ with respect to the horizontal.

A resolver to accomplish this outlined purpose may take several forms including mechanical devices such as rotary transformers or rotary resolvers as well as electronic forms where signals are continuously analyzed to determine the required sine and cosine functions. The resolver 39, as shown in FIG. 9, receives the seismic signals of directional seismic traces being processed and at some point multiplies these signals by the sine of the angle $\phi$ and at other points by the cosine of the angle $\phi$ and then applies these two components of the signals to the vertical and horizontal deflection plates, respectively, of the scanning cathode ray oscilloscope. To accomplish this, the resolver 39 includes a carrier frequency source 71 which may be an oscillator or a generator of alternating current having a frequency several times the highest frequency component of the seismic signal. The frequency of the carrier source must be several times the frequency of the seismic signal, since it must sample the seismic signal at the carrier frequency and produce a representation of the signal by each finite sample. The carrier frequency is fed to an $x$ rate tachometer 72 and a $z$ rate tachometer 73, both tachometers being a means for measuring the instantaneous rate at which the display surface 31 and the oscilloscope 29 are moving in the $x$ and $z$ direction, respectively, this being the definition of the angle $\phi$. The output of the $x$ rate tachometer is applied as input to a 90° phase shifter 74 and has its output joined with the output of the $z$ rate tachometer in a voltage divider network constituting a pair of resistors 75 and 76 with the resistors joined at junction 77. The voltage appearing at junction 77 will therefore be the vector sum of a 90° phase shifted voltage from the $x$ rate tachometer and the voltage from the $z$ rate tachometer. The amplitude of each of these voltages will determine the direction of the vector resultant so that at junction 77 the output signal will have a phase relationship to the original carrier source determined by the angle $\phi$ of the ray path trace and a frequency of the carrier source. The voltage at the junction 77 is fed through a limiter 78 to a chopper 79. Since the phase angle of the voltage at 77 is the only important character of the voltage, the amplitude being meaningless, the limiter 78 merely operates to establish a constant voltage output.

The chopper 79 has the particular directional seismic trace being analyzed and plotted as one input along with the displaced voltage at angle $\phi$ oscillating at the frequency of the carrier source. The output of the chopper 79 is in the same form and direction of the input during half of each period of the carrier frequency and during the other half of the period the output is inverted, or the negative of the input, this inversion being the function of the chopper. FIG. 3 shows a portion of a seismic signal input, and FIG. 4 shows a chopped seismic signal. In the waveform of FIG. 4 the tops of each of the individual pulses are shown as substantially horizontal. In actuality they would, of course, not be truly horizontal, but in the form shown they represent the fact that during each half-period of the carrier, the seismic signal can be considered as if it were a constant D.C. current, represented only by the pulse height and not by its shaped details.

FIG. 5 illustrates a single cyclic pair of pulses in the output of chopper 79 that will be applied as the input to the bandpass filter 81. The bandpass filter 81 cuts out all of the higher harmonics of the carrier frequency and is centered on the carrier frequency to leave a sine wave as its output as shown in FIG. 6. The sine wave output of FIG. 6 is fed to choppers 82 and 83 with chopper 82 having an additional input from the carrier frequency source while chopper 83 has an input at the carrier frequency and shifted 90° by phase shifter 84. The choppers 82 and 83 are therefore energized with common signals from filter 81 and by 90° differing signals at the carrier frequency.

Considering first the chopper 82, its input from the bandpass filter 81 is a sine wave at the carrier frequency and delayed by the angle $\phi$ along with the direct signal from the carrier frequency source. The chopper 82 passes half of the sine wave input and inverts the other half of the sine wave input at the repeating rate of frequency of the input from the carrier source 71. FIG. 7 illustrates the effect on the sine wave input to the chopper due to the chopping and inverting of the second half of the sine wave input. The chopper 82 output will now be pulses of the sine wave input all going positive through the inversion of the negative half of the sine wave input to the chopper. By inspection of the wave form of FIG. 7 and by visualizing what must happen as the angle $\phi$ is varied, it may be seen that where $\phi$ is zero, the sine wave is converted into a set of only positive half-cycles. As angle $\phi$ is increased, part of the converted signal becomes negative, and if angle $\phi$ were increased to 90°, the positive and negative portions would become equal. The output of the chopper 82 is fed to a low pass filter 85 which blocks the frequencies of the order of the carrier frequency and passes the seismic frequencies, thus acting as an integrator. The filter thus provides an output varying from a high, when the angle $\phi$ is zero, to a low, when the angle $\phi$ is 90°. This relationship of a high at an angle of zero to a low at an angle of 90° is actually a variation at the rate of the cosine of the angle $\phi$, so that the horizontal deflection on the oscilloscope 37 is actually being varied in accordance with the cosine of the angle $\phi$.

Referring back to the input to chopper 83 comprising the output from the bandpass filter 81 and the 90° phase shifted carrier source, the first input to chopper 83 therefore lags the other input to chopper 83 by 90° minus the angle $\phi$. This phase difference of 90° minus $\phi$ will produce a relationship of the sine of $\phi$ so that the output from the chopper 83, processed in the same manner as described with respect to chopper 82 and passed to a second low pass filter 86, will carry the seismic signal multiplied by a voltage proportional to the sine of the angle $\phi$. The output from the low pass filter 85 is applied to the horizontal deflection plate of the oscilloscope 29 and the output from the low pass filter 86 is applied to the vertical deflection plate of oscilloscope 29, so that the deflection of the electron beam will make excursions on the face of the oscilloscope in accordance with the vector sum of the seismic signal multiplied by the cosine of the angle $\phi$ and the seismic signal multiplied by the sine of the angle $\phi$. It may now be seen that a display of seismic data on a migrated ray path moving through the subsurface earth formations will have the indications of reflected seismic energy superimposed thereon perpendicular to the instantaneous direction of travel of the seismic ray.

The plotting device of the present invention as shown in block diagram form in FIG. 9 constitutes an apparatus designed to plot both the sonograph-type record and the migrated display of directional seismic traces as disclosed in the copending application of L. P. Stephenson, Serial No. 803,906. Within the device, a programmer 20 energizes a motor for the drive to a reproducible recorder drum 21 on which the records of the individual surface geophones indicating the earth's surface movement in response to a seismic disturbance have been recorded. In the combining of the records to produce the directional seismic traces to be plotted by the apparatus in FIG. 9, the programmer 20 energizes a reproducer pickup head control 22 for adjustably positioning the several reproducer heads 23 to establish the proper time delay between adjacent traces reproductions for extracting directional information contained within the traces. The reproducer pickup head control 22 may also include the function of positioning the pickup heads to apply conventional time corrections to the record of locational seismic traces to take into consideration the relative vertical and horizontal spacing of geophones and other fixed and variable time corrections normally applied to seismic records. With each complete revolution of the recording drum 21, a separate directional seismic trace will be produced, with each trace being a different time lag combination of the several locational seismic traces. Each of the separate directional seismic traces will then be supplied as an input to the intermediate storage device 24. It should be understood that the intermediate storage device 24 may be provided either with a capacity to store the entire number of directional seismic traces to be included in a sonograph record or, since the signals will be analyzed through comparison with the signals developed on neighboring directional seismic traces, the intermediate storage device may be designed to store only that number of directional traces necessary for the analysis of each particular trace as used in the actuation of the remainder of the plotting apparatus. A limited capacity storage device to perform the above operation is disclosed in the copending application of Walter W. Klein, Jr. et al. S.N. 843,221, filed September 29, 1959 for Seismic Cross Section Plotter.

The signals as stored in the intermediate storage device 24 will be transmitted to an event selector 25 as defined and more fully described in the copending application of Walter W. Klein, Jr. and Lee P. Stephenson, Serial No. 842,621, filed September 28, 1959, for Information Selection Programmer. In the event selector 25, a plurality of directional seismic traces are compared or analyzed in any or all criteria of absolute amplitude, relative amplitude, and time coherence to select meaningful events on the record. The input to the selector is shown as three separate inputs constituting the center trace and traces to either side of a particular set of directional seismic traces for the identification of meaningful directional seismic information. The separate inputs may constitute either the central and the next adjacent traces from the central trace, or the central trace and outer traces spaced by one from the central trace. The central trace will also be applied to a delay line 26 where the information in the directional seismic trace under analysis will be delayed in an appropriate amount to permit the comparison of the trace at the central portions of seismic events within the trace while permitting the control of the plotting of a seismic event to begin from some time period prior to the most interesting central portion of an event. The event selector 25 will energize a plotter intensity control 27 to permit energization of a suitable plotting device only when an acceptable event has been selected for plotting. The selector 25 or the intensity control 27 may also include a holding circuit that will permit the continued plotting of a selected event within the directional trace for an adjustable period after the last satisfaction of the event selection criteria.

When an event has been selected, the signal from the deflection amplifier 28 is fed to the resolver 39 where the signal is multiplied by the sine and cosine functions of the particular ray path and instant along the ray path at which the selected event is to be plotted. The signal applied to the oscilloscope from the resolver will then deflect the electron beam of the tube in accordance with the oscillations of the delayed signal from the intermediate storage device 24. The holding control mentioned above will continue suitable energization to the cathode ray tube 29 for an adjustable period designed to include the trailing edge of an event as it is being analyzed in the event selector 25. The directional seismic traces as stored in the intermediate storage device 24 will thus be projected toward a display surface 31 mounted on a rotatable drum 30 to be photographically plotted as records of oscillating traces in varying degrees of intensity to illustrate the events within the directional trace with the events of particular significance dominating the remainder of the trace. The discarded events may be plotted either as dotted lines or in other forms of less dominance or may be eliminated entirely should this be desired.

To provide for the display of the directional seismic data migrated in accordance with the subsurface velocity variations of the earth formation being surveyed, the plotting device of the present invention includes ray path resolution apparatus for the control of the relative movement and position of the plotting surface 31 with respect to the cathode ray tube 29. To accomplish the relative movements necessary, certain initial subsurface velocity information may be supplied from suitable punch card information for interpretation at a punch card reader 33. The information contained on the punched cards will be sensed and converted to energization voltages necessary for the relative positioning of the plotting device and the cathode ray tube by converter 34. The generated voltages will be appropriately applied to motor 36 to rotate the plotting drum 30 and to motor 37 to position the cathode ray tube 29 by rotation of pulleys 38 connected by cable to the cathode ray tube.

Referring now to the display as illustrated on the display surface in FIG. 1, it may be seen that the individual ray paths as therein illustrated are not straight radial lines emanating from a central shot point but are curved or flared as are the actual ray paths of seismic energy into and out of a geological cross-section. It is well known in the seismic arts that the energy from a seismic disturbance in the earth's surface travels with increasing velocity through the subsurface formations as the compaction of the formation increases. Furthermore, as the energy passes from a lower velocity medium into a higher velocity medium striking the higher velocity medium at some angle other than normal to the interface, some of the energy is reflected back from the interface, while the rest of the energy passes through with the direction of the transmitted energy being different from the direction of the incident energy in accordance with the velocity ratios within the two contiguous formations. Because of this, the ray paths of the seismic energy will not be straight lines through the subsurface formations with the occasional exception of the path starting vertically down into the formation, but will be curved ray paths, usually with more noticeable curvature the greater their deviation from the vertical. For these reasons, it is necessary to energize the motors that control the relative movement of the display surface and oscilloscope in accordance with certain velocity information that may be known for the formation being analyzed or that may be assumed upon the basis of other knowledge about the probable composition and configuration of the subsurface. The plotter of the present invention provides for the inclusion of this velocity information through predetermined ray path identifications established by prepunched cards.

The motors 36 and 37 may be appropriately energized in accordance with the ray paths identified by a plurality of separate punched cards to be read by punched card reader 33 with each of the separate cards being prepunched in accordance with information establishing a separate migrated trace emanating from the reference point. In this manner, as each directional trace is produced and analyzed, the ray path information contained on an appropriate punched card will determine the energization for motors 36 and 37 to provide the proper X and Z coordinate displacements of the display surface 31 with respect to the oscilloscope 29.

The information on the punched cards is in the form of digital data identifying the coordinates of a plurality of positions within a geologic cross-section. The punched cards represent X and Z coordinate identifications of the plurality of positions at incremental time periods along a seismic energy path through the known or assumed earth formation with each group of punched holes representing the movement necessary to effect travel from the position of the last coordinate identification to a new coordinate position. The punched digital data is sensed at appropriate time intervals and interpolating potentiometers employed to establish the necessary voltages for energization of the appropriate motion producing motors 36 or 37 to effect the necessary relative movement between the display surface 31 and the oscilloscope 29.

Tachometers 72 and 73 for X and Z rates of movement are fixed to the motors 36 and 37 respectively to provide the appropriate voltages necessary for the analysis of the angle $\phi$ on the determination of the sine and cosine multipliers needed for varying the deflection angle within the oscilloscope. As previously defined with respect to FIGS. 1–8, the signal from the intermediate storage device 24 is thus applied to the deflection plates of the oscilloscope 29 multiplied by sine and/or cosine functions where appropriate to establish the proper direction of excursion for the displayed seismic signals.

While certain preferred embodiments of the invention have been specifically disclosed, it should be understood that the invention is not limited thereto as many variations in the present apparatus as well as other forms of function resolvers will be readily apparent to those skilled in the art and the invention is to be given its broadest possible interpretation within the terms of the following claims.

I claim:
1. In combination: means for producing a plurality of sources of common carrier waves, means for producing two separate electrical indications of rates of rotation of relatively movable objects in two perpendicular directions, means for modulating a first of said sources of carrier waves with one of said electrical indications of rate of rotation, means for modulating a second of said sources of carrier waves with the other of said electrical indications of rotation, means for shifting the phase angle of one of said first and second modulated carrier waves 90° with respect to the other, means for vectorially combining said shifted and unshifted modulated carrier waves to produce a reference signal at the frequency of said carrier waves and differing in phase from said carrier waves by the angle of said vectorial combination representing the vectorial direction of the relative movement of said objects; an input signal, means for chopping said input signal by said reference signal to produce a pulse train at the frequency of said reference signal, said pulse train constituting a plurality of positive and negative pulses each having the instantaneous amplitude of the input signal, means for filtering said pulse train to produce a train of pulses at said reference frequency modulated in amplitude by said input signal, means for comparing said modulated pulse train to a third source of said carrier waves including means for chopping said modulated pulse train to reverse the polarity of alternate pulses within said train, means for shifting the phase of a fourth source of said carrier wave by 90° and means for comparing said modulated pulse train to said shifted fourth source of carrier waves including means for chopping said modulated pulse train to reverse the polarity of alternate pulses within said train, and filtering means associated with each of said comparing means to filter said chopped pulse train to remove variations at the frequency of said carrier waves and to provide separate output signals representing said input signal multiplied by the cosine of the angle of said vectorial direction of relative movement at said first comparator and said input signal multiplied by the sine of the angle of said vectorial direction of relative movement at said second comparator.

2. Apparatus for resolving sine and cosine voltage functions representative of a line perpendicular to a direction of relative travel between a first movable object and a second object movable relative to said first object comprising: means for generating a voltage representative of the rate of movement of said first object, means for generating a voltage representative of the rate of movement of said second object, a fixed frequency reference voltage, means for modifying said reference voltage by said first generated voltage, means for modifying said reference voltage by said second generated voltage, means for shifting said reference voltage modified by said second generated voltage 90° in phase, means for combining said modified reference voltages to establish a resolving voltage at the frequency of said reference and having a phase relative to said reference determined by the vectorial direction of relative travel between said first and second objects, circuit means supplying an input signal, means for chopping said input signal by said resolving voltage to produce a pulse train of alternatively positive and negative pulses, means for filtering said pulse train to produce a sine wave having the frequency of said resolving voltage and said reference and differing in phase from said reference voltage by said angle of vectorial direction, a first comparator means for comparing said sine wave to said reference voltage including means for converting said reference voltage to a train of square wave pulses and means for chopping said sine wave to reverse the polarity of alternate one-half cycles of said sine wave, a second comparator means for comparing said sine wave to said reference voltage shifted 90° including means for converting said reference voltage shifted 90° to a train of square wave pulses and means for chopping said sine wave to reverse the polarity of alternate one-half cycles of said sine wave, and filtering means associated with each of said comparing means to filter said chopped sine waves to remove variations at the frequency of said reference voltage and to provide separate output signals representing said input signal multiplied by the cosine of the angle of said vectorial direction of travel from said first comparator and said input signal multiplied by the sine of the angle of said vectorial direction of travel from said second comparator.

3. Apparatus for resolving sine and cosine functions of a line perpendicular to direction of relative travel between a first movable object and a second object movable relative to said first object comprising: means for generating a voltage reference representing the rate of movement between said objects in a first component direction, means for generating a voltage reference representing the rate of movement between said objects in a second direction of travel perpendicular to said first, a fixed frequency reference voltage, means for modifying said reference voltage by said first generated voltage, means for modifying said reference voltage by said second generated voltage, means for shifting said reference voltage modified by said second generated voltage 90° in phase, means for combining said modulated voltages to establish a resolving voltage at the frequency of said reference and having a phase relative to said reference voltage determined by the vectorial direction of travel between said two relatively movable objects, a chopping circuit actuated by said resolving voltage to produce a pulse train of alternatively positive and negative pulses at the frequency of said reference voltage, means for filtering said pulse train to produce a sine wave having the frequency of said reference and differing in phase from said reference voltage by said angle of vectorial direction, a first comparator means for comparing said sine wave to said reference voltage including means for converting said reference voltage to a train of square wave pulses and means for chopping said sine wave to reverse the polarity of alternative one-half cycles of said wave, a second comparator means for comparing said sine wave to said reference voltage shifted 90° including means for converting said reference voltage shifted 90° to a train of square wave pulses and means for chopping said sine wave to reverse the polarity of alternate one-half cycles of said sine wave, and filtering means associated with each of said comparing means to filter said chopped sine waves to remove variations at the frequency of said reference voltage and to provide separate output signals representing the resolved cosine of said perpendicular to said direction of travel at said first comparator and the resolved sine of said perpendicular to said direction of travel at said second comparator.

References Cited in the file of this patent
UNITED STATES PATENTS 2,926,852    Bennett _____ Mar 1, 1960